(12) United States Patent
Okada et al.

(10) Patent No.: US 6,452,732 B1
(45) Date of Patent: Sep. 17, 2002

(54) FILTER CHANGE-OVER DEVICE

(75) Inventors: Tadanori Okada, Utsunomiya; Naoya Kaneda, Chigasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/504,279

(22) Filed: Feb. 15, 2000

(30) Foreign Application Priority Data

Feb. 19, 1999 (JP) ............................................ 11-041635
Jan. 25, 2000 (JP) ........................................ 2000-015191

(51) Int. Cl.⁷ ............................ G02B 7/02; G03B 5/06; G02C 1/04
(52) U.S. Cl. ...................... 359/813; 359/822; 359/814; 396/342; 351/107
(58) Field of Search ................................ 359/813, 822, 359/814, 821; 396/342, 592; 351/107, 100, 101

(56) References Cited

U.S. PATENT DOCUMENTS 4,392,723 A * 7/1983 Gehmann ................... 350/407
5,311,356 A * 5/1994 Freilich ...................... 359/467
5,852,519 A * 12/1998 Do et al. ..................... 359/822
5,978,611 A * 11/1999 Yamamoto et al. ......... 396/429
6,210,399 B1 * 4/2001 Parel et al. ..................... 606/5

* cited by examiner

Primary Examiner—Georgia Epps
Assistant Examiner—Tim Thompson
(74) Attorney, Agent, or Firm—Robin, Blecker & Daley

(57) ABSTRACT

A filter driving device has a first optical filter, a second optical filter and a rotary driving member. The rotary driving member is arranged such that, when the rotary driving, member is rotated in a predetermined direction, the rotary driving member drives the first and second optical filter members to bring about three filter setting states including a state in which the first optical filter is located on an optical path, another state in which the second optical filter is located on the optical path and a further state in which neither of the first and second optical filters is located on the optical path.

38 Claims, 12 Drawing Sheets

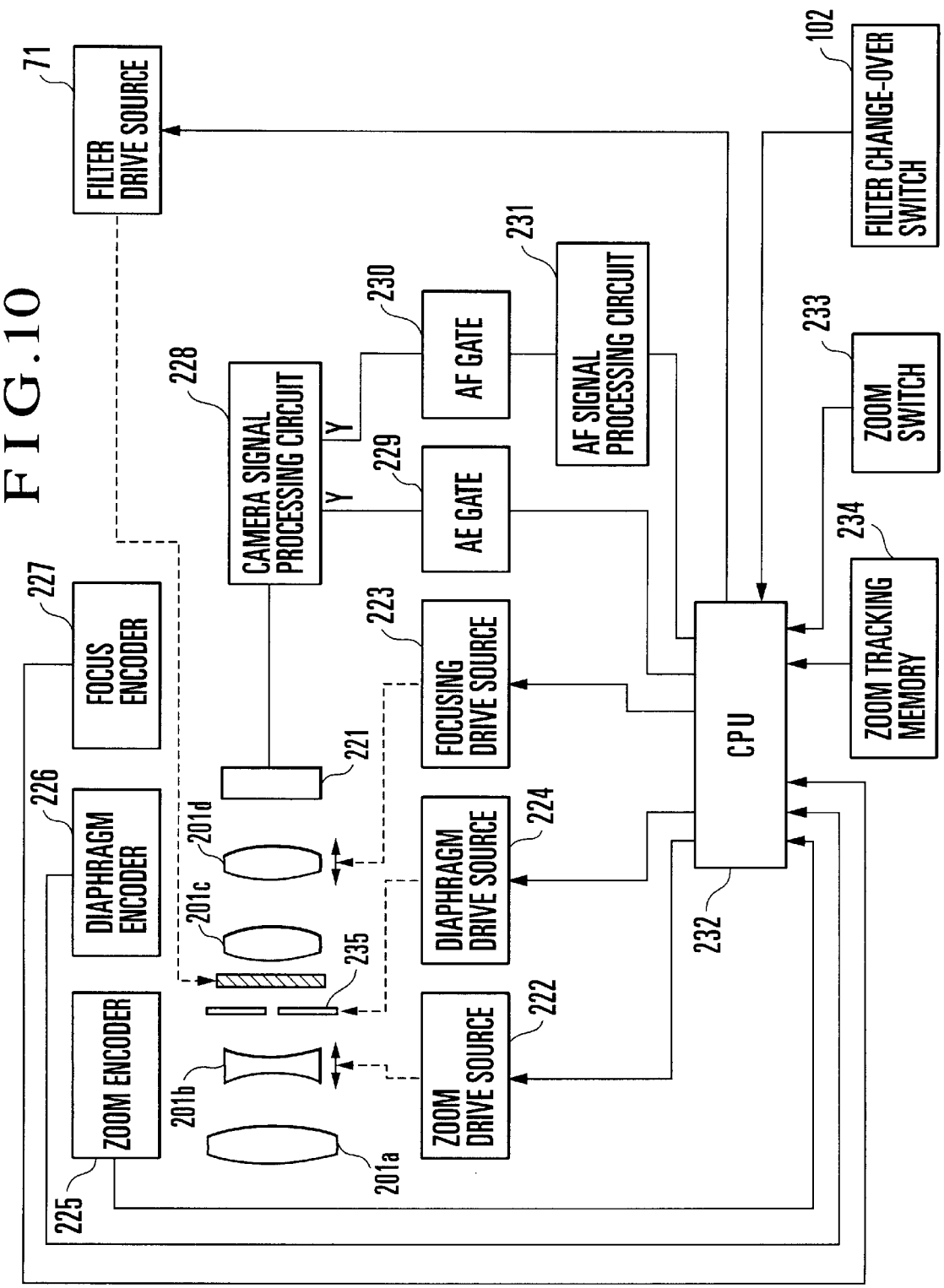

FILTER CHANGE-OVER DEVICE

BACKGROUND OF THE INVENTION

1. Field of the Invention

The present invention relates to a driving device for selectively moving a plurality of driven members from the position on one and the same axis to a predetermined position by switching the use of the driven members from one over to another, or a filter change-over device for change-over of ND (neutral density) filters or the like to be used by being inserted into and retracted out of an optical path for adjustment of light quantity in an image pickup device of an optical apparatus, such as a video camera or the like, and more particularly to a filter change-over device arranged to selectively insert a plurality of filters of different densities into the optical path by changing use of them from one over to another.

2. Description of Related Art

Zoom lenses for video cameras have been most popularly composed of four lens units, i.e., in order from the object side, a positive fixed lens unit, a negative movable lens unit, a positive fixed lens unit and a positive movable lens unit. The known zoom lenses adapted for video cameras of course include other zoom lenses arranged differently from the lens arrangement mentioned above.

FIGS. 12(A) and 12(B) show the construction of a zoom lens barrel of the most popular four-lens-unit arrangement. As shown in FIGS. 12(A) and 12(B), the zoom lens is composed of four lens units 201a to 201d, i.e., a front lens unit 201a which is fixed, a variator lens unit 201b which is arranged to perform a magnification varying action by moving along an optical axis 205, an a focal lens unit 201c which is fixed, and a focusing lens unit 201d which is arranged to move along the optical axis 205 to keep a focal plane constant when the magnification varying action is performed as well as to adjust focus.

Referring to FIGS. 12(A) and 12(B), guide bars 203, 204a and 204b are arranged in parallel with the optical axis 205 to guide the moving lens units and also to prevent the moving lens units from rotating. A DC motor 206 is a drive source arranged to move the variator lens unit 201b. While the DC motor 206 is used as the drive source for the variator lens unit 201b, a stepping motor may be used in place of the DC motor 206, in the same manner as a stepping motor which is used as a drive source for the focusing lens unit 201d.

The variator lens unit 201b is held by a holding frame 211. The holding frame 211 is provided with a pressing spring 209 and a ball 210 which is pushed by the force of the pressing spring 209 to engage a screw groove 208a formed in a screw bar 208. Therefore, when the screw bar 208 is driven to rotate by the DC motor 206 through an output shaft 206a and a gear train 207, the holding frame 211 moves in the direction of the optical axis along the guide bar 203.

The focusing lens unit 201d is held by a holding frame 214. The holding frame 214 has a sleeve part fitted on the guide bar 204b to act as a guide. A screw member 213 is arranged in the neighborhood of the sleeve part to be in one body with the holding frame 214 in the direction of the optical axis. When a stepping motor 212 is caused to rotate, its output shaft 212a rotates. Then, a male screw part formed on the output shaft 212a and a female screw part or a rack part formed in the screw member 213 move in association with the rotation of the stepping motor 212. This causes the holding frame 214 to move in the direction of the optical axis along the guide bars 204a and 204b. The details of a part where the holding member 214 and the screw member 213 are coupled with each other are disclosed, for example, in Japanese Laid-Open Patent Application No. HEI 4-136806.

As mentioned above, the interlocking mechanism of the stepping motor 212 is applicable also for driving the variator lens unit 201b.

In a case where a lens unit is arranged to be moved by a stepping motor together with a moving frame, as described above, the absolute position in the direction of an optical axis of the lens unit can be detected by arranging a photo-interrupter (not shown) and a light-blocking wall which is formed integrally with the moving frame and by arranging one reference position of the moving frame in the direction of the optical axis to be detectable with the photo-interrupter and the light-blocking wall. Position detecting means can be thus arranged to be capable of detecting the absolute position of a lens holding frame, i.e., the moving frame, by setting the lens holding frame at the reference position and, after that, by continuously counting the number of driving pulses applied to the stepping motor.

FIG. 13 is a block diagram showing the electrical arrangement of a camera body included in a conventional image pickup apparatus. In FIG. 13, all parts that are indicated by the same reference numerals as in FIGS. 12(A) and 12(B) are arranged in the same manner as those shown in FIGS. 12(A) and 12(B).

Referring to FIG. 13, a solid-state image sensor 221 is composed of a CCD, etc. A zoom drive source 222 is arranged to drive the variator lens unit 201b. The zoom drive source 222 includes the motor 206, the gear train 207 which is interlocked with the motor 206, the screw bar 208, etc. The zoom drive source 222 may be also arranged to include a stepping motor, etc., in the same manner as the focusing lens unit driving arrangement shown in FIG. 12(B). A focusing drive source 223 is arranged to drive the focusing lens unit 201d and includes the stepping motor 212, the output shaft 212a which has a male screw formed thereon and the screw member 213 which is arranged integrally with the holding frame 214 in the direction of the optical axis.

The camera body further includes a diaphragm drive source 224, a zoom encoder 225 and a focus encoder 227. The zoom and focus encoders 225 and 227 are arranged to respectively detect the absolute positions of the variator lens unit 201b and the focusing lens unit 201d in the direction of the optical axis. In a case where a DC motor is employed as the drive source for driving the variator lens unit 201b as in the case of FIG. 12(A), an absolute position encoder such as a potentiometer or the like is employed as the zoom encoder 225. A magnetic encoder may be used instead of using a potentiometer.

In a case where a stepping motor is employed as a drive source, the absolute position of a lens unit is generally detected by setting a lens holding frame at a reference position and by continuously counting the number of operating (driving) pulses applied to the stepping motor, as mentioned above.

A diaphragm encoder 226 is arranged by having a Hall element inside of a meter which is a drive source for a diaphragm 235 and by detecting a relation between the rotating position of a rotor and that of a stator.

A camera signal processing circuit 228 is arranged to perform an amplifying process, a gamma correction process, etc., on a video signal outputted from a CCD 221 in a predetermined manner. A contrast signal of the video signal thus processed passes through an AE gate 229 and an AF gate 230. These gates 229 and 230 are arranged to set and determine an optimum signal fetching range within the whole image plane for determining an exposure and for focus adjustment. Such a gate either may be arranged to have a variable size or may be plurally arranged. However, for the sake of simplification of description, the details of the gate arrangement are omitted from the description.

An AF signal processing circuit 231 is provided for automatic focusing (AF) and is arranged to form one or a plurality of outputs relative to high-frequency components of a video signal. A zoom switch 233 is connected to a CPU 232. A zoom tracking memory 234 is arranged to store information on focusing lens positions to be taken according to object distances and variator lens positions obtained when a magnification varying action is performed. A memory disposed within the CPU 232 may be used as the zoom tracking memory 234.

When the zoom switch 233 is operated by the user of the apparatus, for example, the CPU 232 acts to keep the variator lens unit 201b and the focusing lens unit 201d in a predetermined positional relation computed on the basis of information stored in the zoom tracking memory 234. For this purpose, the CPU 232 drives and controls the zoom drive source 222 and the focusing drive source 223 in such a way as to cause the current absolute position of the variator lens unit 201b in the direction of the optical axis as detected by the zoom encoder 225 to coincide with a computed position of the variator lens unit 201b and also to cause the absolute position of the focusing lens unit 201d in the direction of the optical axis as detected by the focus encoder 227 to coincide with a computed position of the focusing lens unit 201d.

In the automatic focusing action, the CPU 232 drives and controls the focusing drive source 223 in such a way as to make the output of the AF signal processing circuit 231 have a peak thereof.

Further, in order to obtain an apposite exposure, the CPU 232 acts to have the average value of the output of a luminance signal passing through the AE gate 229 at a predetermined value by controlling the diaphragm drive source 224 to cause the aperture diameter of the diaphragm 235 to be at a position where the output of the diaphragm encoder 226 becomes the predetermined value.

When the aperture is stopped down to an aperture diameter smaller than a predetermined value, an image on an image forming plane is caused to deteriorate by the diffraction of light. This phenomenon is well known. If the object of shooting is located under a bright outdoor condition, in controlling the aperture of the diaphragm to make the average value of a luminance signal outputted as a contrast signal from the image sensor which is a CCD or the like, the diaphragm aperture would become smaller than an aperture diameter at which such a diffraction of light takes place. The quality of an image picked up under such a condition, therefore, tends to deteriorate.

To solve this problem, video cameras adapted for general users are arranged as follows. An ND filter is stuck to the blades of the diaphragm to be in one body therewith to prevent occurrence of diffraction at a small aperture by gradually covering the aperture with the ND filter accordingly as the aperture is stopped down to a smaller diameter. If the object of shooting is very bright and the small-aperture diffraction still takes place despite of this arrangement, the shutter speed (electric charge take-in time in the case of a CCD) of the video camera is arranged to become faster so that an exposure can be made in an optimum manner.

However, if the ND filter of the light quantity adjustment system is arranged to cover the aperture in an intermediate position with respect to the aperture, either a luminescent spot uncleanly blurs at distances before and after a main object of shooting or the quantity of light obtained within an image plane becomes uneven.

It has been known to solve these problems by inserting the ND filter into an optical path in a retractable state separately from the diaphragm, instead of sticking the ND filter to the diaphragm blades.

For this purpose, a filter change-over device is mechanically arranged as a driving device to selectively move a driven member (the filter) to a predetermined position. FIG. 14 shows one example of such a filter change-over device as viewed in the direction of the optical axis.

Referring to FIG. 14, an ND filter part 256 is made of a resin film or the like. A filter frame 252 is illustrated by a full line in a state of being within the optical path and by a broken line in a state of being outside of the optical path. Fixing claw parts 257 are arranged to secure the ND filter part 256 to the filter frame 252. Reference numeral 253 denotes the center of rotation of the filter frame 252. The filter frame 252 is provided with a boss part which is formed integrally with one end part of the filter frame 252. An operation switch 251 is illustrated by a full line as it is in a state of having the ND filter part 256 within the optical path and by a broken line as it is in a state of having the ND filter part 256 outside of the optical path. The operation switch 251 is arranged, for example, on an external side part of the lens barrel to be operated in the direction of an arrow 254. A tension spring 258 is arranged to pull the filter frame 252 toward the outside of the optical path.

When the operation switch 251 which is on the outside of the lens barrel is vertically slid by the user, the boss part 260 which is interlocked with the operation switch 251 causes the filter frame 252 to rotate around the rotation center 253 to change the position of the ND filter part 256 between its positions inside and outside of the optical path, from one position over to the other.

In a case where it is insufficient to set only one kind of the ND filter, some of known lens barrels have been arranged to have a plurality of filters coaxially arranged side by side in a turret-type structure to have one center of rotation and to be selected one after another. Further, in such a case, some filters that give special effects are sometimes used in place of the ND filters.

However, the turret-type filter change-over device necessitates arrangement of a rotary disk having filters mounted thereon, which sometimes has hindered efforts to make lens barrels in small size.

BRIEF SUMMARY OF THE INVENTION

The invention is directed to the reduction in size of a driving device for selectively moving a plurality of driven members to a predetermined position and in size of a filter change-over device and an optical apparatus.

To attain the above object, in accordance with an aspect of the invention, there is provided a filter driving device, which comprises a first optical filter member, a second optical filter member, and rotary driving means, the rotary driving means being operable to be rotated in a predetermined rotating direction so as to drive the first and second optical filter members to selectively bring about one of a state in which the first optical filter member is located on an optical path, a state in which the second optical filter member is located on the optical path and a state in which neither of the first and second optical filter members is located on the optical path.

In particular, in the above-stated filter driving device, the rotary driving means is an operation lever operable to be rotated around a predetermined axis.

Further, in the filter driving device, the rotary driving means is arranged to be rotated by a motor.

Further, in the filter driving device, the first and second optical filter members are arranged to rotate around a common axis of rotation.

Further, in the filter driving device, each of the first and second optical filter members is a neutral density filter.

In addition, the filter driving device further comprises an urging member arranged to exert urging forces on the first and second optical filter members to urge the first and second optical filter members respectively to rotate in opposite directions around the common axis of rotation. The rotary driving means is a lever member. The lever member is arranged to rotate around an axis of rotation different from the common axis of rotation so as to drive the first and second optical filter members.

In the above-stated filter driving device, the lever member is provided with abutting parts arranged to abut on the first and second optical filter members.

In addition, in the filter driving device, the rotary driving means includes a rotary member arranged to rotate around an axis of rotation different from the common axis of rotation, a first cam member arranged to drive the first optical filter member by rotating integrally with the rotary member around the axis of rotation of the rotary member, and a second cam member arranged to drive the second optical filter member by rotating integrally with the rotary member on the axis of rotation of the rotary member.

Further, in the above-stated filter driving device, the rotary member is provided with a gear which is formed along a periphery thereof and is coupled with an output gear of a motor.

Further, in the filter driving device, the rotary driving means is arranged to drive the first and second optical filter members so as to bring about a further state in which both the first and second optical filter members are located on the optical path.

The above and further objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 10 is a block diagram showing the control arrangement of the filter change-over device according to the fifth embodiment of the invention.

FIGS. 12(A) and 12(B) are sectional views showing a zoom lens barrel which is used for conventional video cameras or the like.

DETAILED DESCRIPTION OF THE INVENTION

Figure 1C:
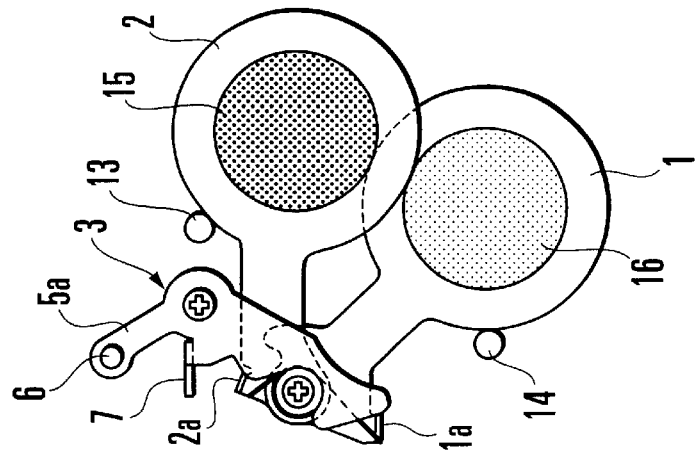
FIGS. 1(A), 1(B) and 1(C) are diagrams showing the manner of changing over filters from one over to the other by a filter change-over device according to a first embodiment of the invention.

Hereinafter, preferred embodiments of the invention will be described in detail with reference to the drawings.

FIGS. 1(A), 1(B) and 1(C), FIG. 3 and FIG. 4 relate to a first embodiment of the invention. In the case of the first embodiment, a driving device arranged according to the invention to selectively move a plurality of driven members from the position on one and the same axis to a predetermined position is applied to a filter change-over device. The plurality of driven members are filters which differ in density from each other. The filter change-over device is adapted for an image pickup device of an optical apparatus, such as a video camera or the like. The filters are arranged to be selectively used in an optical path for adjustment of light quantity.

In FIGS. 1(A), 1(B) and 1(C), FIG. 3 and FIG. 4, reference numeral 1 denotes a first filter frame. Reference numeral 2 denotes a second filter frame. Reference numeral 3 denotes a filter change-over lever. Reference numeral 4 denotes a fulcrum shaft which serves as the center of rotation of the filter change-over lever 3.

Figure 3:
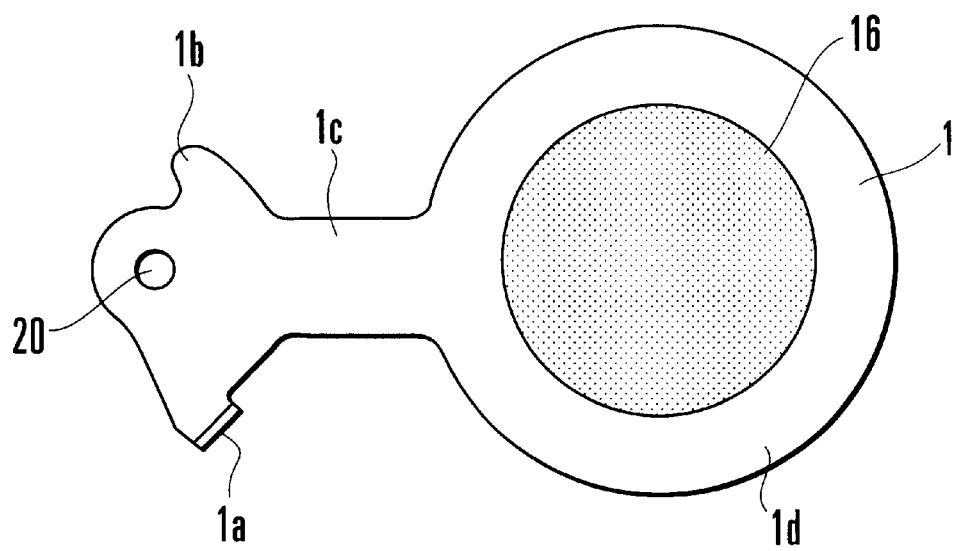
FIG. 3 is a front view showing a first filter frame in the filter change-over device according to the first embodiment.
Figure 4:
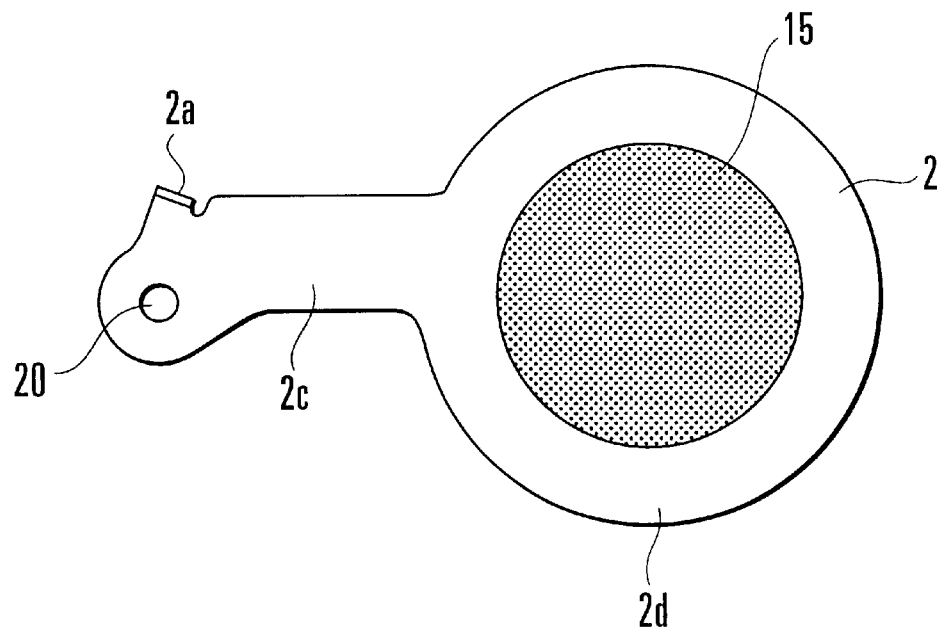
FIG. 4 is a front view showing a second filter frame in the filter change-over device according to the first embodiment.

As shown in FIGS. 3 and 4, both the first filter frame 1 and the second filter frame 2 have filter mounting frame parts 1d and 2d formed respectively at the fore end parts of their lever parts 1c and 2c. The fore end parts of the lever parts 1c and 2c of the first and second filter frames 1 and 2 are mounted on a fulcrum shaft 20 to be rotatable thereon. The fulcrum shaft 20, which acts as a common center of rotation for the first and second filter frames 1 and 2, is mounted on a fixing member (not shown).

Figure 1B:
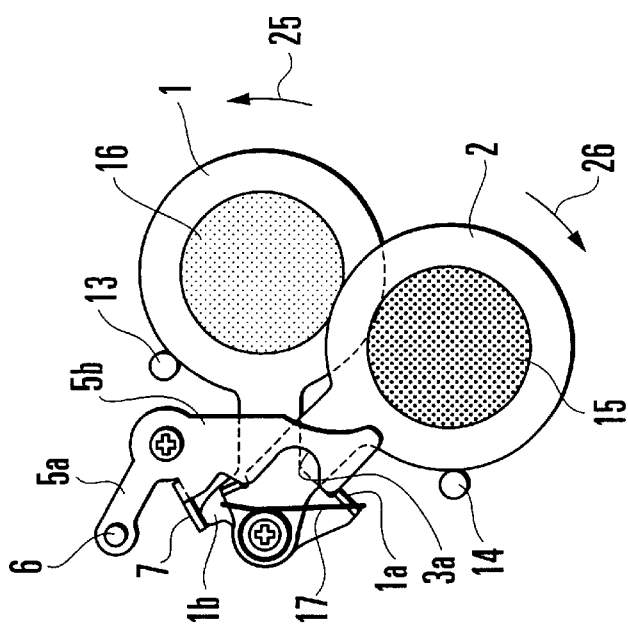

A coil spring 17 is attached to the first and second filter frames 1 and 2 in such a way as to have them engage each other and is arranged to urge them to move in the directions of parting from each other as shown with arrows 25 and 26 in FIG. 1(B). In this case, under the urging force of the coil spring 17, counterclockwise rotation of the first filter frame 1 is restricted as the first filter frame 1 abuts on a stopper 13. The clockwise rotation of the second filter frame 2 under the urging force of the coil spring 17 is restricted as the second filter frame 2 abuts on a stopper 14.

The fulcrum shaft 20, which is the center of rotation of the first and second filer frames 1 and 2, is located approximately in the same position as the center of the optical axis of photo-taking light in the horizontal direction The stoppers 13 and 14 are respectively located above and below this horizontal axis. The two ends of the coil spring 17 are arranged to engage a bent-up part 1a of the first filter frame 1 located below the center of rotation of the first filter frame 1 and a bent-up part 2a of the second filter frame 2 located above the center of rotation of the second filter frame 2. With the coil spring 17 in this state, the first and second filter frames 1 and 2 are urged by the coil spring 17 in the directions of parting from each other.

In a state shown in FIG. 1(B), the second filter frame 2 is located at a position of being retracted from an optical path while the first filter frame 1 is located at a service position on the optical path. The first filter frame 1 can be moved to its retracted position by causing the first filter frame 1 to rotate clockwise against the spring force of the coil spring 17. The second filter frame 2 can be moved to the above-stated service position by causing the second filter frame 2 to rotate counterclockwise against the spring force of the coil spring 17. Further, to move the second filter frame from the service position back to the retracted position, the second filter frame 2 is released from the engagement by which the second filter frame 2 is held at the service position. With the second filter frame 2 thus disengaged, the spring force of the coil spring 17 acts to cause the second filter frame 2 to move to the retracted position.

To move the first filter frame 1 from the retracted position to the service position, the first filter frame 1 is released from the engagement by which the first filter frame 1 is held at the retracted position. With the first filter frame 1 thus disengaged, the spring force of the coil spring 17 brings the first filter frame 1 to the service position.

In the case of the first embodiment, the first filter frame 1 and the second filter frame 2 are moved from the retracted positions to the service positions and from the service positions to the retracted positions by means of the filter change-over lever 3 which is arranged to be manually operated.

The filter change-over lever 3 is formed in an approximately L planar shape composed of an operation arm part 5a and a work arm part 5b. The filter change-over lever 3 which is in this shape is arranged to be rotatable around a fulcrum shaft 4 mounted on a fixing member (not shown).

Figure 14:
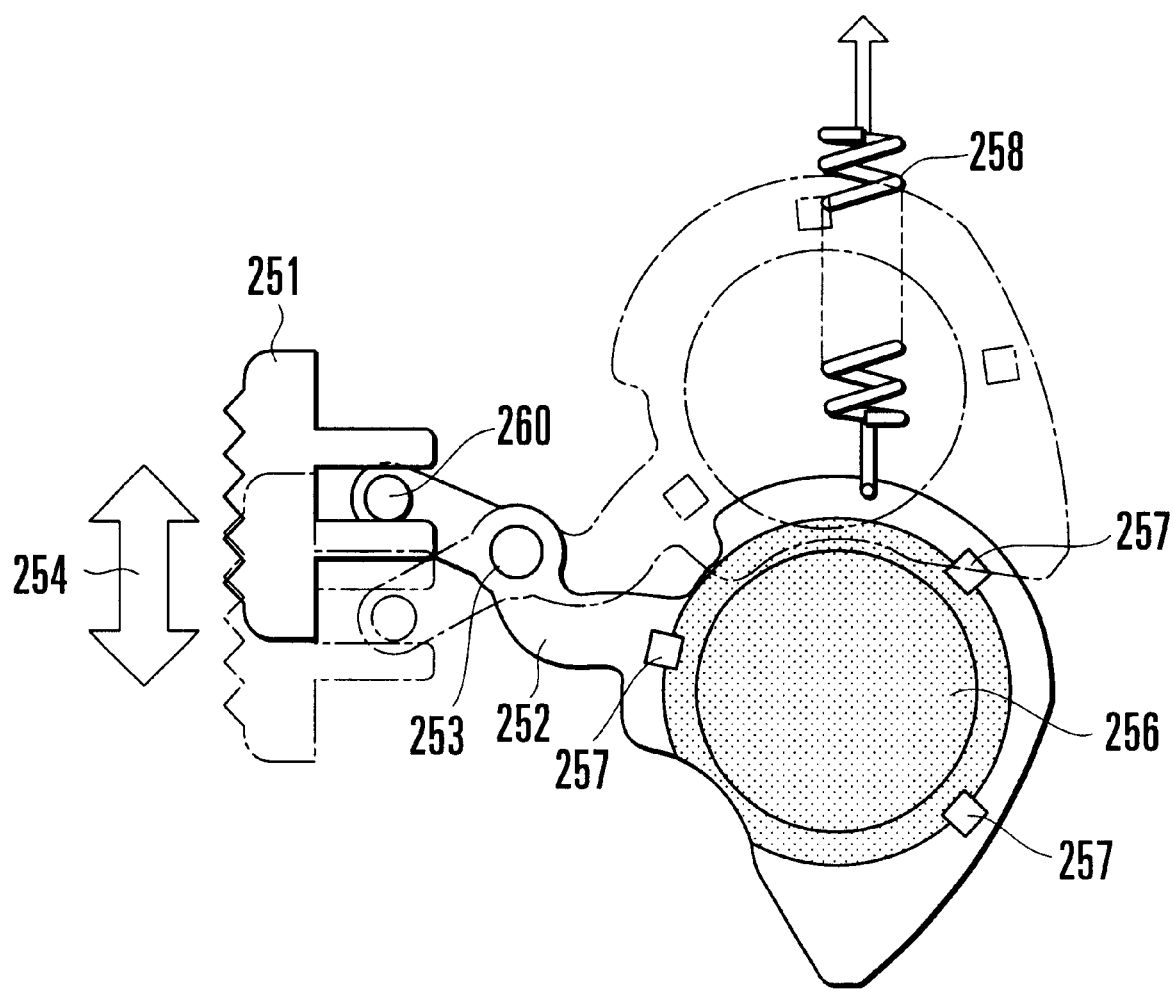
FIG. 14 is a sectional view of a conventional filter change-over device.

The operation arm part 5a of the filter change-over lever 3 is not only arranged to permit a manual operation by the user but also is interlocked with a change-over switch (not shown). A boss part 6 on the fore end part of the operation arm part 5a is interlocked with an external switch in the same manner as the boss part 260 which is shown in FIG. 14.

Since the first filter frame 1 must be arranged to be held at its retracted position, in the case of the first embodiment, the first filter frame 1 is provided with a protruding part 1b which is formed on the lever part 1c located opposite to the bent-up part 1a. The counterclockwise rotation of the first filter frame 1 is prevented by arranging a bent part 7 of the filter change-over lever 3 to abut on the fore end of the protruding part 1b. In this instance, since the first filter frame 1 is forcibly pushed at the retracted position, the second filter frame 2 can be stably held at its retracted position without rattling.

On one side of the filter change-over lever 3 where the work arm part 5b is facing the fulcrum shaft 20, the bent part 7 is formed by bending to a length long enough for abutting on the protruding part 1b of the first filter frame 1 in the neighborhood of the fulcrum shaft 4. The filter change-over lever 3 is further provided with a U-shaped cut-out part 3a. At the fore end of the U-shaped cut-out part 3a, a first change-over protruding part 10 is formed to have a wide fore end. In moving the second filter frame 2 from its retracted position to the service position to replace the first filter frame 1, the first change-over protruding part 10 abuts on the bent-up part 1a of the first filter frame 1 to rotate the first filter frame 1 from the service position to its retracted position and to prevent the first filter frame 1 from being pulled back to the service position by the second filter frame 2.

Further, on the side of the filter change-over lever 3 where the work arm part 5b is facing the fulcrum shaft 20, a second change-over protruding part 9 is formed in an angular (hill) shape between the bent part 7 and the first change-over protruding part 10. In replacing the first filter frame 1 with the second filter frame 2 at the service position, the second change-over protruding part 9 engages the bent-up part 2a of the second filter frame 2, at about the same time when the first change-over protruding part 10 abuts on the bent-up part 1a of the first filter frame 1. Then, the second change-over protruding part 10 rotates the second filter frame 2 counterclockwise to bring the second filter frame 2 to the service position in place of the first filter frame 1.

Figure 1A:
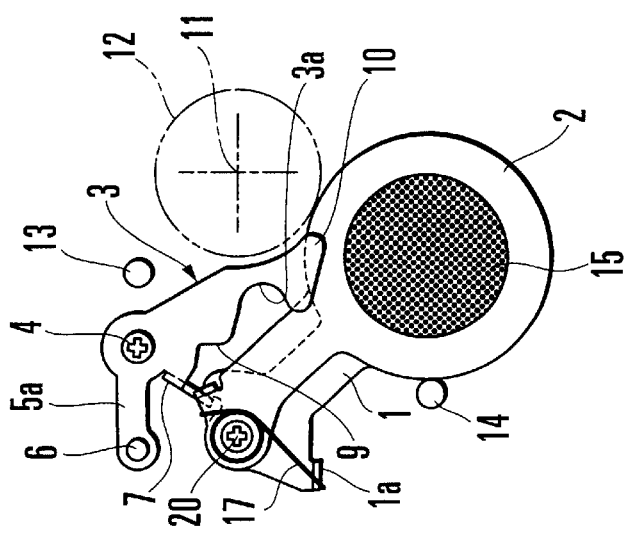

In FIG. 1(A), reference numeral 11 denotes a photo-taking optical axis, and reference numeral 12 denotes a range of effective rays of light around the photo-taking optical axis 11.

When the first or second filter frame 1 or 2 is in a state of having entered the optical path, the stopper 13 keeps the first or second filter frame 1 or 2 in the same position by preventing it from rotating. When the first or second filter frame 1 or 2 is in a state of being outside of the optical path, the stopper 14 keeps the first or second filter frame 1 or 2 in the same position by preventing it from rotating.

A second filter 15 is held by the frame part 2d of the second filter frame 2. A first filter 16 is held by the frame part 1d of the first filter frame 1. The first filter 16 is a relatively thin ND filter which gives a relatively large transmission light quantity. The second filter 15 is a relatively thick ND filter which gives a relatively small transmission light quantity. Further, the first and second filters 16 and 15 may be filters arranged to give some special effects.

The operation of the filter change-over device according to the first embodiment is next described with reference to FIGS. 1(A), 1(B) and 1(C).

FIG. 1(A) shows the filter change-over device in a state of having no filter frame inserted in the optical path. FIG. 1(B) shows the filter change-over device in a state of having the first filter frame 1 inserted in the optical path. FIG. 1(C) shows the filter change-over device in a state of having the second filter frame 2 inserted in the optical path while the first filter frame 1 is outside of the optical path.

The first filter frame 1 to which the first filter 16 is stuck is urged by the spring 17 to rotate in the direction of the arrow 25 around the fulcrum shaft 20 which serves as the center of rotation. The second filter frame 2 to which the second filter 15 is stuck is urged by the spring 17 to rotate in the direction of the arrow 26 around the fulcrum shaft 20 which serves as the center of rotation. Therefore, in the state shown in FIG. 1(B), the first and second filter frames 1 and 2 are respectively abutting on the stoppers 13 and 14 under the urging force of the spring 17.

In the state shown in FIG. 1(A), the fore end boss part 6 of the filter change-over lever 3 has been pushed down from the state of FIG. 1(B). This state is maintained with a clicking force generated by a click member which is provided, for example, at a change-over switch part (not shown).

When the filter change-over device is operated to change its state from the state of FIG. 1(B) to the state of FIG. 1(A), the filter change-over lever 3 is rotated around the fulcrum shaft 4 which serves as the center of rotation. Then, the bent part 7 of the filter change-over lever 3 pushes the protruding part 1b of the first filter frame 1. This causes the first filter frame 1 to rotate around the shaft 20 in the direction opposite to the direction of the arrow 25 against the urging force of the spring 17 which is exerted in the direction of the arrow 25. As a result, the filter change-over device comes to have both the first and second filter frames 1 and 2 outside of the optical path, as shown in FIG. 1(A).

With the first filter frame 1 in the state of being inserted in the optical path as shown in FIG. 1(B), when the filter change-over lever 3 is rotated clockwise, the state of FIG. 1(B) changes into the state of FIG. 1(C) in which the first filter frame 1 comes outside of the optical path while the second filter frame 2 comes into the optical path. In this instance, the second change-over protruding part 9 of the filter change-over lever 3 engages the bent-up part 2a of the second filter frame 2 to cause the second filter frame 2 to rotate in the direction opposite to the direction of the arrow 26 against the urging force of the spring 17. The second filter frame 2 is thus brought into the optical path. Meanwhile, the first change-over protruding part 10 of 3.the filter change-over lever 3 engages the bent-up part 1a of the first filter frame 1 to cause the first filter frame 1 to rotate in the direction opposite to the direction of the arrow 25 in which the urging force of the spring 17 is exerted. The first filter frame 1 is thus moved out of the optical path. In that instance, the U-shaped cut-out part 3a formed in the work arm part 5b of the filter change-over lever 3 comes to fit on the peripheral part of the fulcrum shaft 20 of the first and second filter frames 1 and 2 to ensure the stroke of the clockwise rotation of the filter change-over lever 3.

In the first embodiment, as described above, by rotating the filter change-over lever 3 in one and the same direction, i.e., clockwise, the state of the filter change-over device changes from the state of FIG. 1(A) to the state of FIG. 1(B) and then to the state of FIG. 1(C). The filter inserting/retracting state then serially changes from a state (1) in which both the filters of two kinds are located outside of an optical path to another state (2) in which only the first filter is inserted in the optical path and then to a further state (3) in which the first filter is moved out of the optical path while the second filter is alone inserted into the optical path.

Figure 7C:
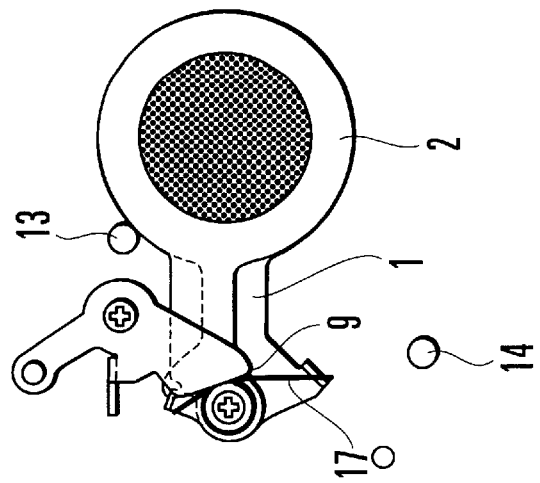
FIGS. 7(A), 7(B) and 7(C) are front views showing a filter change-over device according to a second embodiment of the invention.
Figure 7B:
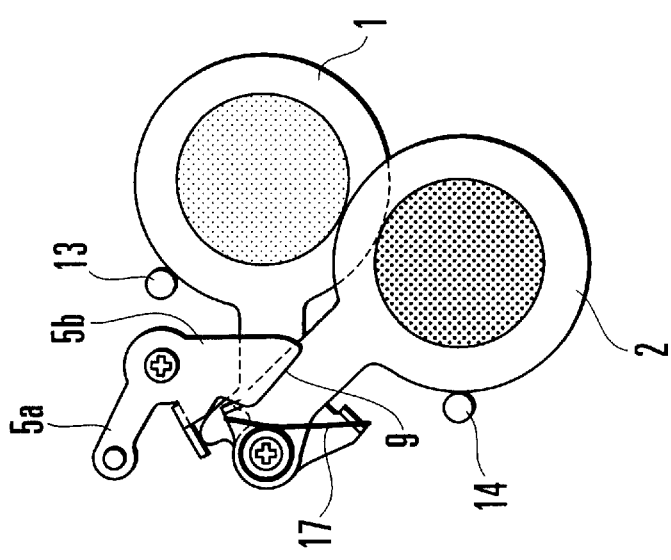
Figure 7A:
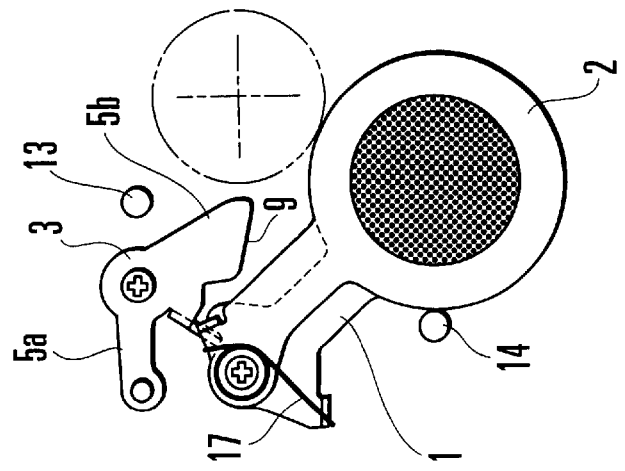

FIGS. 7(A), 7(B) and 7(C) relate to a filter change-over device according to a second embodiment of the invention. In the case of the first embodiment, with the filter change-over lever rotated in one direction, the filter inserting/retracting state serially changes from the state (1) in which both the filter frames of two kinds are located outside of an optical path to a state (2) in which only the first filter frame 1 is inserted in the optical path and then to a state (3) in which the first filter frame 1 is moved out of the optical path while the second filter frame 2 is alone inserted into the optical path. On the other hand, in the case of the second embodiment, the filter inserting/retracting state is arranged to change from a state (1) in which both the filter frames of two kinds are located outside of an optical path to a state (2) in which only the first filter frame 1 is inserted in the optical path and then to a state (3) in which the first filter frame 1 is left in the optical path while the second filter frame 2 is also inserted into the optical path.

More specifically, the second embodiment differs from the first embodiment as follows. The bent-up part 1a of the first filter frame 1 is arranged as described above to engage one end of the spring 17. The first change-over protruding part 10 which is formed on the work arm part 5b of the filter change-over lever 3 is removed in the case of the second embodiment, while the second change-over protruding part 9 is left alone on the work arm part 5b.

The operation of the filter change-over device according to the second embodiment is shown in FIGS. 7(A), 7(B) and 7(C). In the case of the first embodiment, in shifting the state of FIG. 1(B) to the state of FIG. 1(C), the first filter frame 1 is moved out of the optical path by having the first change-over protruding part 10 come to engage the bent-up part 1a of the first filter frame 1 to cause the first filter frame 1 to rotate around the fulcrum shaft 20. This interlocked action is, however, not performed in the second embodiment.

Figure 6:
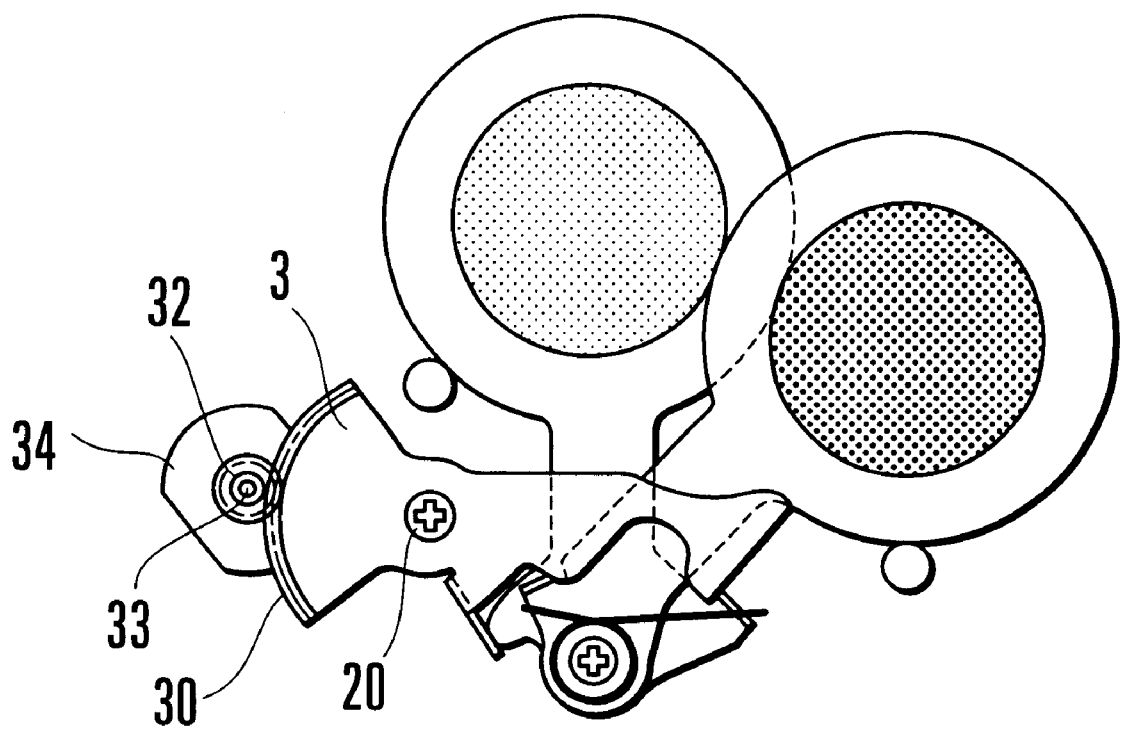
FIG. 6 is a front view showing a filter change-over device according to a third embodiment of the invention.

FIG. 6 shows a filter change-over device according to a third embodiment of the invention.

In the case of the third embodiment, the filter change-over lever 3 is arranged to be driven by a motor. This arrangement permits a change-over switch (not shown) to be disposed at any desired position, such as on one side of the lens barrel or on an outside part of a camera body. A filter setting position selected by the change-over switch can be detected by an electric switch (not shown). Information on the result of detection is examined and decided by a CPU (not shown). Then, the motor is driven in such a way as to obtain a filter-using state according to the selected filter setting position.

The filter change-over operation of the third embodiment shown in FIG. 6 is exactly the same as that of the first embodiment shown in FIGS. 1(A) to 1(C). In this case, however, the boss part 6 which is provided on the filter change-over lever 3 in the first embodiment for interlocking the filter change-over lever 3 with a conventional change-over switch is replaced with a gear part 30 which is formed on a peripheral part of the filter change-over lever 3 to have its center of rotation at the fulcrum shaft 20.

The gear part 30 of the filter change-over lever 3 is arranged to be in mesh with a gear 32 which is provided on the output shaft 33 of a motor body 34. The states (positions) of filters can be serially changed from one state over to another by rotation of the motor.

Although it is not shown in FIG. 6, the third embodiment includes a filter state detecting switch which is arranged to detect the inserted or retracted state of each filter. The result of detection is supplied to the CPU to be examined and decided there. The motor can be controlled to drive and stop the motor according to the result of decision made by the CPU. The filter state detecting switch can be selected from among various known detecting elements such as a photo-interrupter, a leaf switch, a magnetic detection switch, etc.

Further, in each of the first, second and third embodiments, the two filter frames and the change-over lever are of course arranged at different positions, i.e., at spaced positions, in the direction of the optical axis. If they are arranged at one position, they would come into collision with each other and would not work.

A fourth embodiment of the invention relates to the spaced arrangement of the first and second filters in the direction of the optical axis.

The filters such as the ND filters of video cameras designed for use by general consumers are often made of film-like materials. In such a case, the filter might be deformed to warp or twist by variations in temperature, humidity, etc.

Therefore, in arranging the first and second filters at different positions in the direction of the optical axis in the state of being stuck to different filter frames as in the case of each of the first, second and third embodiments, the spacing distance (dimension of clearance) between the filters must be set at such a value that prevents the filters from colliding with or rubbing against each other even if the warping or twisting of the filters occurs.

In the case of the fourth embodiment, therefore, the dimension of a clearance between adjacent ND filters is set at a value between 0.5 mm and 1.5 mm.

This value was obtained from the results of tests conducted by using ND filters of a size about equal to an effective aperture diameter obtained when the diaphragm of an ordinary video camera designed for general consumers was fully opened.

It is not desirous to have the filters spaced more than necessary, in respect of preventing an increase in size of the lens barrel.

Figure 2:
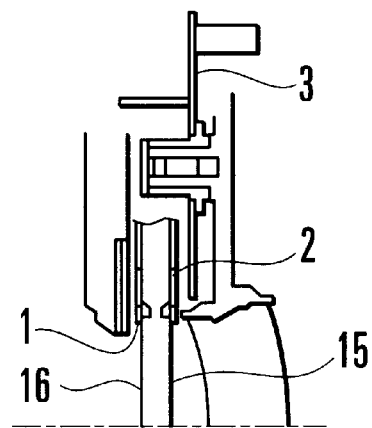
FIG. 2 is a sectional view of the filter change-over device in the first embodiment as viewed from the side thereof.

FIG. 2 shows the manner in which the filter change-over device shown in FIGS. 1(A), 1(B) and 1(C) is actually arranged within a lens barrel with some clearance left between the filters 15 and 16.

Figure 5:
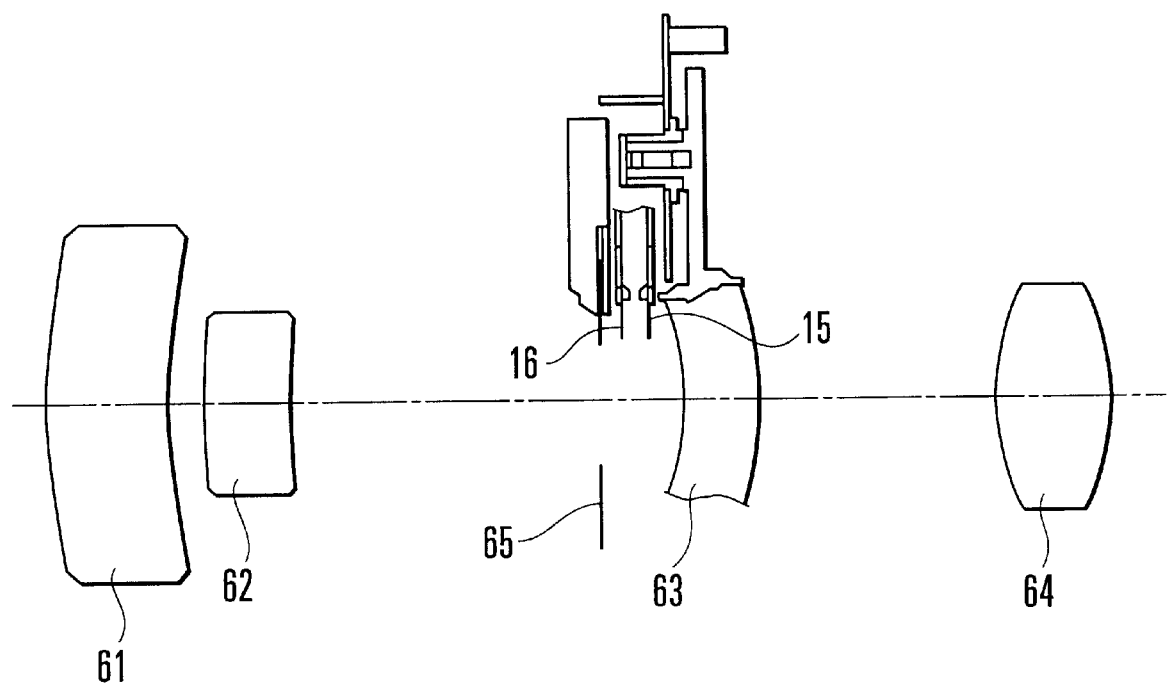
FIG. 5 is a sectional view showing the arrangement of a zoom lens including the filter change-over device in the invention.

FIG. 5 shows, by way of example, the arrangement of the filter change-over device disposed within an actual zoom lens. In the case of this example of an optical system, the zoom lens is an inner-focus (rear-focus) zoom lens of the so-called four-lens-unit structure mentioned in the foregoing description of prior art. In FIG. 5, there are illustrated a front lens unit 61 which is fixed, a second variator lens unit 62 which performs a magnification varying action by moving in the direction of an optical axis, diaphragm blades 65, a third lens unit 63 which is fixed, and a focusing lens unit 64 which acts to keep a focal plane constant when magnification varies as well as to adjust focus by moving in the direction of the optical axis. The first and second filters 16 and 15 are interposed in between the third lens unit 63 and the diaphragm blades 65.

The allocated position of the first and second filters 16 and 15 is not limited to the position shown in FIG. 5. The first filter 16 and the second filter 15 may be disposed, for example, between the variator lens unit 62 and the diaphragm blades 65. It is also possible to have the second filter 15 disposed between the third lens unit 63 and the diaphragm blades 65 while the first filter 16 is disposed between the variator lens unit 62 and the diaphragm blades 65.

Figure 8:
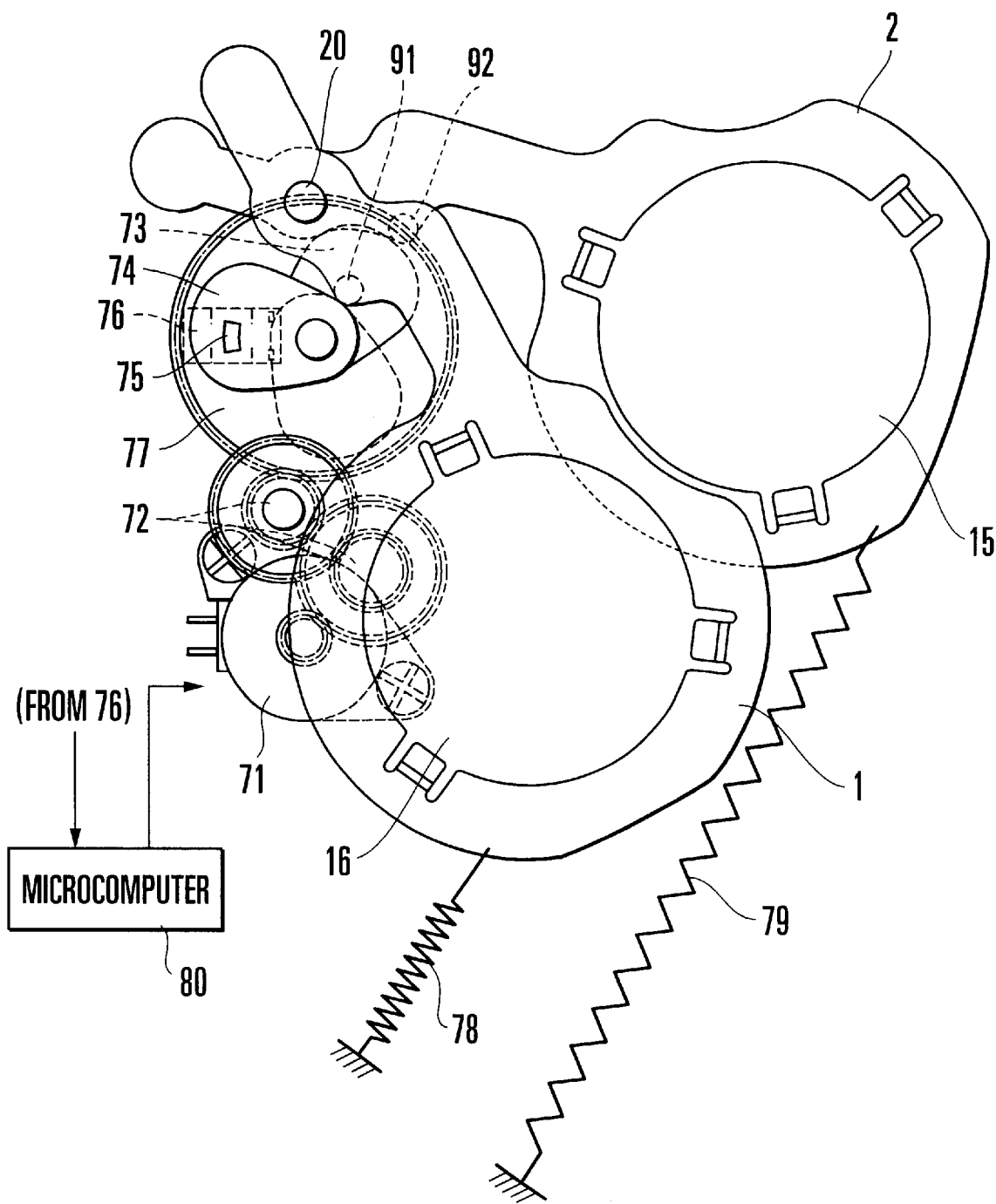
FIG. 8 is a front view showing a filter change-over device according to a fifth embodiment of the invention.

FIGS. 8 to 10 relate to a filter change-over device according to a fifth embodiment of the invention.

Referring to FIG. 8, unlike other embodiments disclosed above, a first filter frame 1 having a first filter 16 and a second filter frame 2 having a second filter 15 are urged to rotate in the same direction by springs 78 and 79. The first filter frame 1 is integrally provided with a cam follower part 91 and the second filter frame 2 is integrally provided with a cam follower part 92.

A motor drive source 71 which is a stepping motor or the like is arranged in combination with a reduction gear train 72 and a last-stage gear 77.

A cam 74 is arranged to abut on the cam follower part 91 of the first filter frame 1. A cam 73 is arranged to abut on the cam follower part 92 of the second filter 2. These cams 74 and 73 are arranged in a coaxially overlapping state together with the last-stage gear 77. A wall 75 which is provided as a light-blocking wall for a photo-interrupter 76 rises from the gear 77 rectangularly with respect to the paper surface of the drawing. A microcomputer 80 is arranged to act as control means.

FIG. 8 shows the filter change-over device in a state in which the second filter frame 2 has been moved into a position within an optical path by pushing the cam follower part 92 with the cam 73 against the spring force of the spring 79. In this state, the cam 74 abuts on the cam follower 91 at an angular position where the first filter frame 1 is located in a retracted position. When the drive source 71 rotates, for example, further counterclockwise, the rotation of the drive source 71 causes the last-stage gear 77 to rotate through the gear train 72. Then, the two cams 73 and 74 rotate together with the last-stage gear 77.

This causes the second filter frame 2 to rotate toward its retracted position by the spring force of the spring 79. On the other hand, the first filter frame 1 is caused to move toward the inside of the optical path against the spring force of the spring 78. The cam followers 91 and 92 are thus respectively pushed by the cams 74 and 73 to move the two filter frames 1 and 2 into and out of the optical axis one after another.

Figures 9A, 9B:
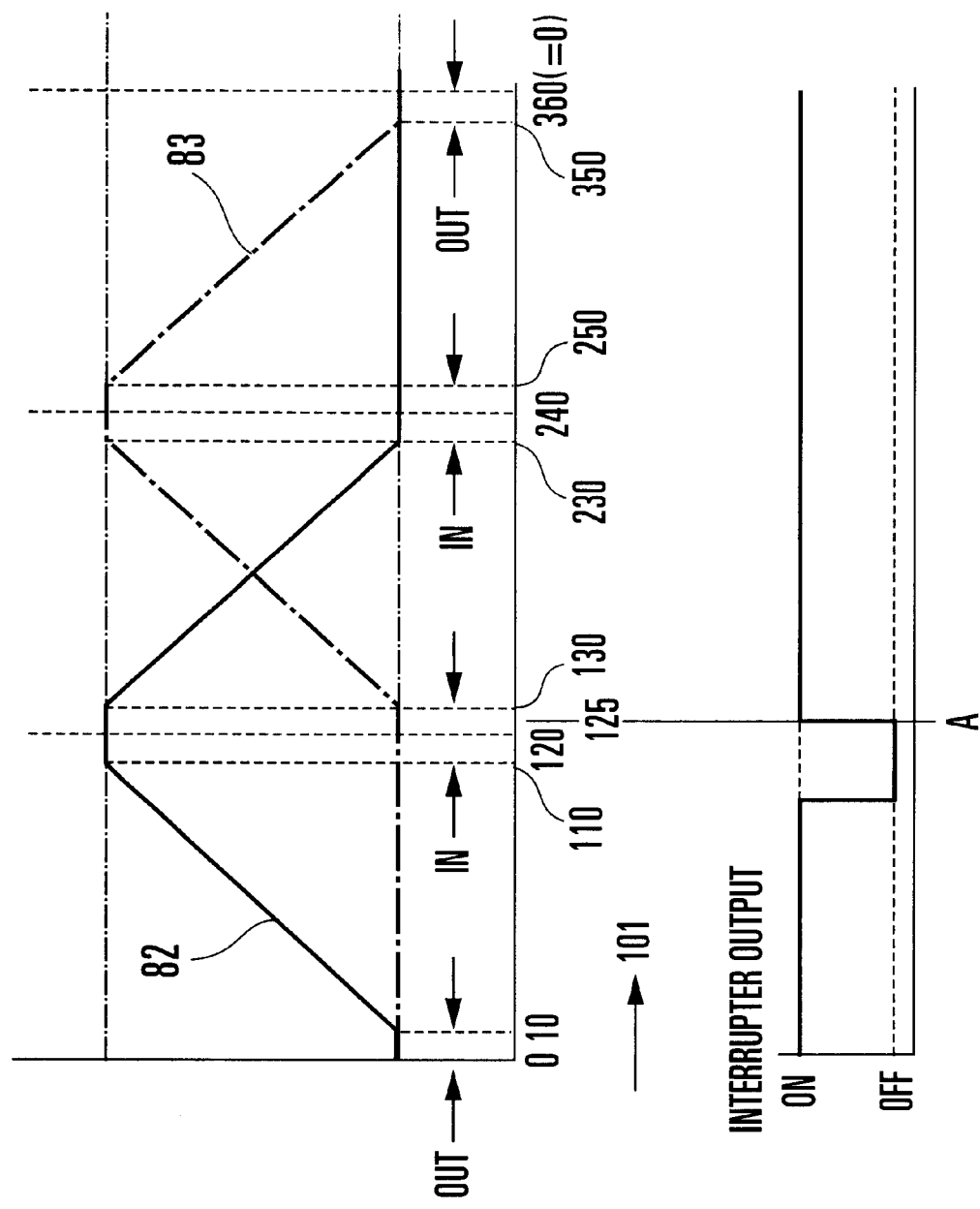
FIG. 9(A) is a diagram showing the number of pulses of a stepping motor in FIG. 8 in relation to filter inserting and retracting states.
FIG. 9(B) is a diagram showing the output of a photo-interrupter in FIG. 8.

FIG. 9(A) shows the number of pulses of a stepping motor employed as the drive source 71, on its abscissa axis, and the state of inserting and retracting the filter frames on the ordinate axis. In FIG. 9(A), reference symbol OUT denotes the outside of the optical path, and reference symbol IN denotes the inside of the optical path. In this case, the last-stage gear 77 (i.e., the cams 73 and 74) is arranged to be caused to make one rotation by driving the stepping motor in the same direction with 360 pulses of the stepping motor. A characteristic line 82 which is a full line represents the state of the first filter frame 1. A characteristic line 83 which is a one-dot chain line represents the state of the second filter frame 2. As shown in FIG. 9(A), the 360th pulse is the same as the zero-th pulse. Both the first and second filter frames 1 and 2 are outside of the optical path during a period between the 350th and 10th pulses. The first filter frame 1 is inside of the optical path during a period between the 110th to 130th pulses. The second filter frame 2 is inside of the optical path during a period between the 230th and 250th pulses.

To use such numbers of pulses as an encoder, the photo-interrupter 76 is arranged in combination with the light-blocking wall 75 on the last-stage gear 77. FIG. 9(B) shows the output of the photo-interrupter 76. In driving the drive source 71 in the direction of an arrow 101 as shown in FIGS. 9(A) and 9(B), for example, a position A indicated in FIG. 9(B) is used as a reference position, the first and second filter frames 1 and 2 are set at this position by turning the power supply on, and this position is assumed to be at an address "1125". After that, the microcomputer 80 can find the positions of the first and second filter frames 1 and 2 by correlating pulse numbers with the positions of the first and second filter frames 1 and 2.

When the user operates a filter change-over switch (not shown) to give an instruction for filter change-over, the instruction is read by the microcomputer 80. The microcomputer 80 then drives the drive source 71 in accordance with the instruction. Further, with the drive source 71 arranged to be driven in one and the same direction, the relation between the addresses (on the abscissa axis) and the states (on the ordinate axis) can the improved with respect to backlash which takes place in the reduction gear train 72.

Further, in bringing the state in which the second filter frame 2 is in the inserted state back to the state in which the first filter frame 1 is inserted in the optical path, if the drive source 71 is driven still in one and the same direction, the desired shift of state would be carried out through an intermediate state of having both the first and second filter frames 1 and 2 outside of the optical path. The passing through the intermediate state is avoidable by driving and causing the drive source 71 to reversely rotate.

In reversely rotating the drive source 71, the adverse effect of the above-stated backlash is removable by storing data of the amount of backlash in the microcomputer 80 beforehand and by correcting the applicable address according to the amount or value of the backlash in store.

Figure 13:
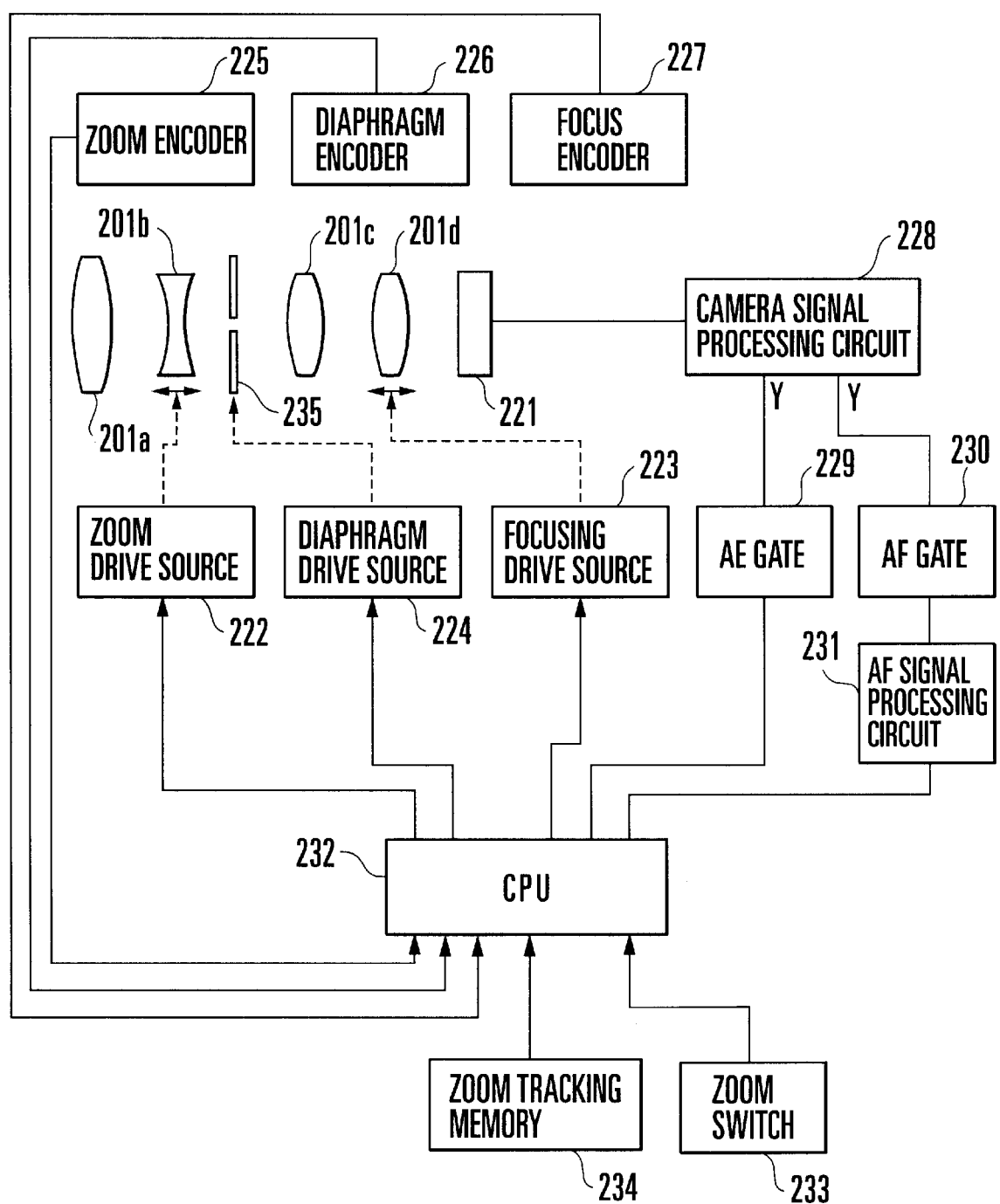
FIG. 13 is a block diagram showing the arrangement of a conventional video camera.

FIG. 10 is a block diagram showing the control arrangement suited for putting the fifth embodiment into practice. The arrangement of the fifth embodiment includes a filter drive source 71 and a microswitch 102 for filter change-over in addition to the arrangement of FIG. 13 which is used in the foregoing description of prior art.

Positions allocatable to the filter change-over switch 102 are limited in the case of a mechanical interlocking arrangement such as the first embodiment. In the case of the fifth embodiment, however, the position of the filter change-over switch 102 can be selected from a wider range by arranging information on change-over of filter frames (holders) to be transmitted to the microcomputer through a flexible printed circuit board or lead wires.

In the fifth embodiment, a stepping motor is used as the drive source. However, the stepping motor may be replaced with a DC motor. In a case where a DC motor is used as the drive source, a certain detecting means is separately arranged to detect the filter change-over state. As for encoders, various methods are conceivable. For example, a rotary potentiometer is interlocked with the last-stage gear, or a digital code plate is provided on the last-stage gear in combination with a conductive brush arranged to be in sliding contact with the code plate for detecting the states of filters through this combination of the digital code plate and the brush.

A sixth embodiment of the invention has its basic structure arranged in the same manner as the fifth embodiment. However, the sixth embodiment differs from the fifth embodiment in that the filter change-over is arranged to be carried out by operating a dial provided on a cam driving shaft without having recourse to any drive source. In the case of the sixth embodiment, the filter positions or states are thus arranged to be changed from one position over to another by rotating the dial. However, with the dial operation part set in a position of being exposed to the outside, if there is a fear that some unnecessary light might leak into the lens, the operation dial may be arranged at another suitable position to rotate the cam part through a gear part.

Figure 11A:
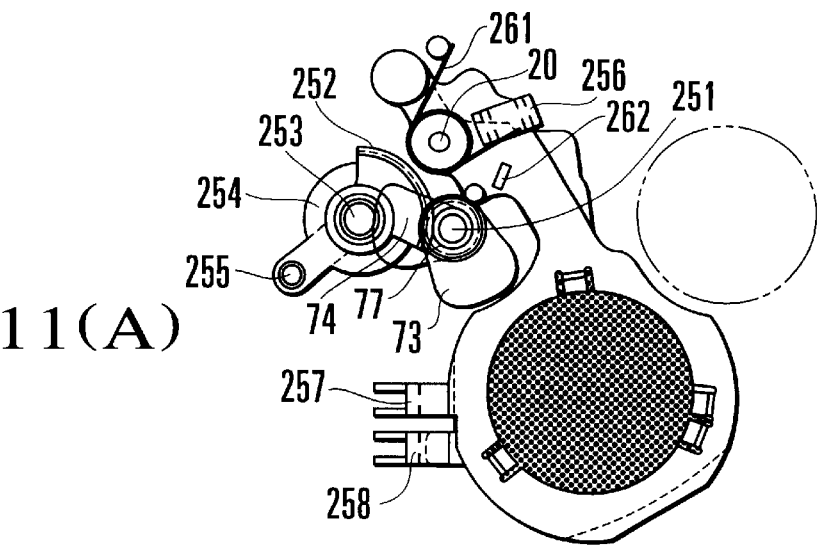
FIGS. 11(A), 11(B) and 11(C) are diagrams showing the manner of changing over filters from one over to the other in a filter change-over device according to a seventh embodiment of the invention.
Figure 11B:
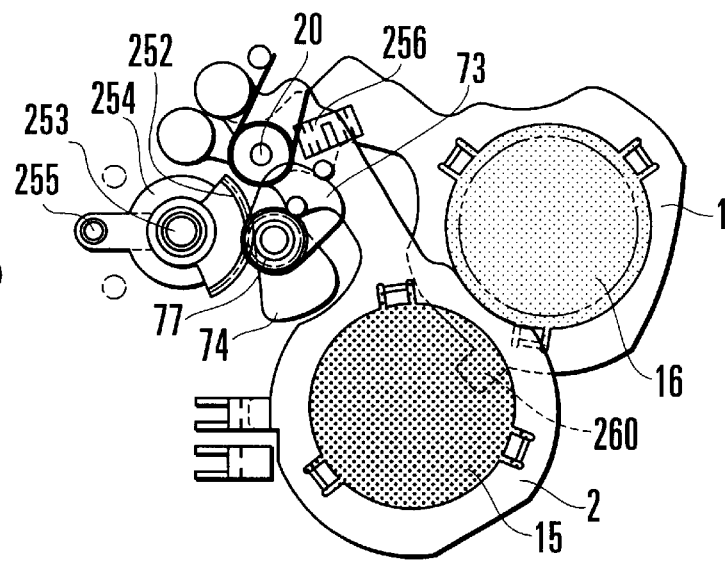
Figure 11C:
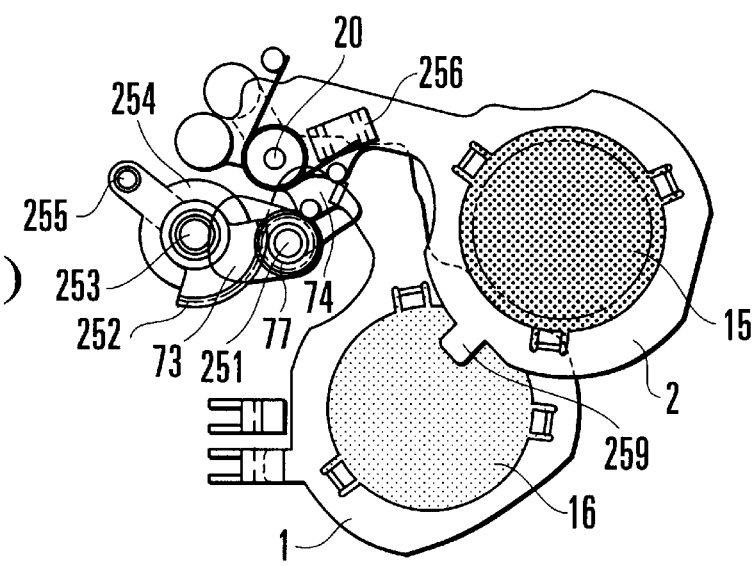
Figure 12A:
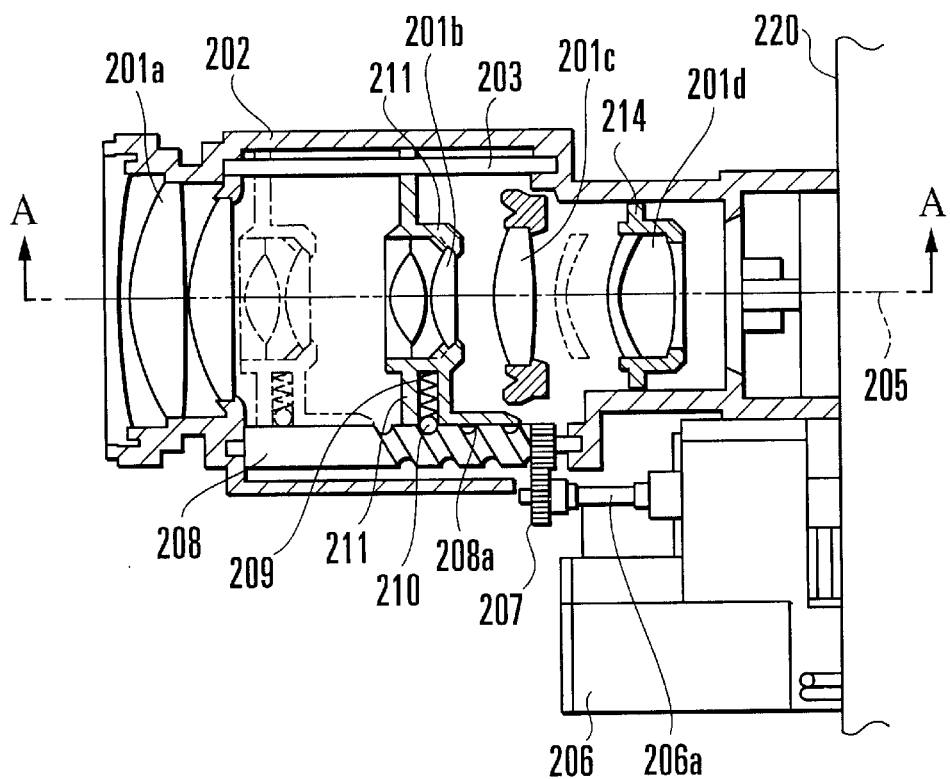
Figure 12B:
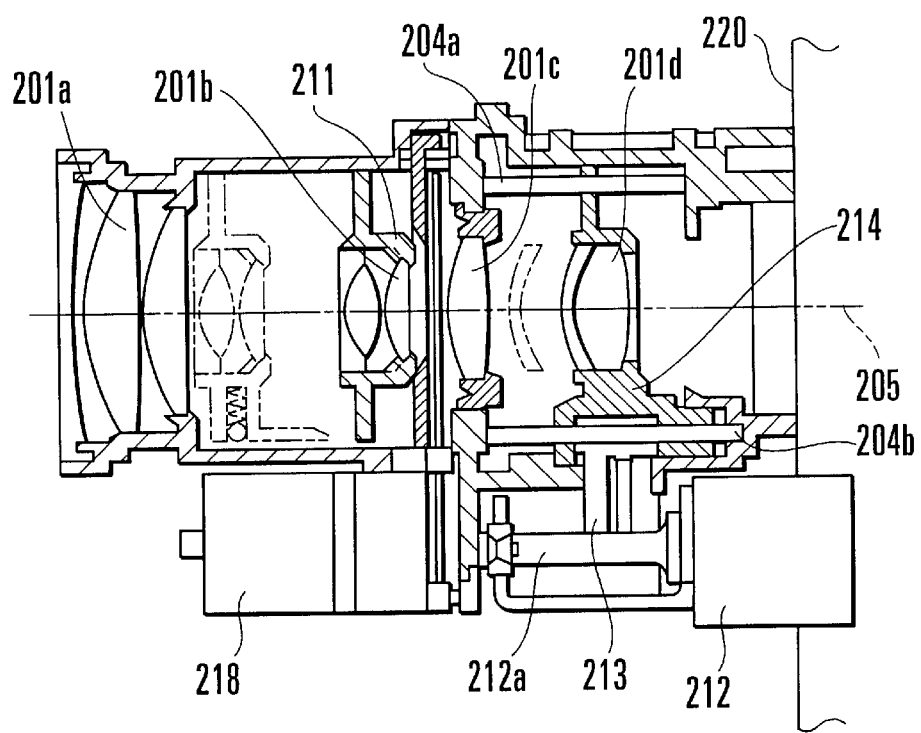

FIGS. 11(A), 11(B) and 11(C) show a filter change-over device according to a seventh embodiment of the invention. In FIGS. 11(A), 11(B) and 11(C), all parts that are the same as those shown in FIG. 8 are indicated by the same reference numerals as in FIG. 8, and the details of them are omitted from the following description.

Referring to FIGS. 11(A), 11(B) and 11(C), two cams 73 and 74 are arranged to rotate on the center of rotation 251 integrally with the gear 77. The rotation of the cam 73 determines the position of the first filter frame 1 while the rotation of the cam 74 determines the position of the second filter frame 2. The first and second filter frames 1 and 2 are urged by a spring 261 to rotate on the center of rotation 251 respectively in the direction of moving outside of the optical path.

A lever 254 is provided with an operation part 255 at its one fore end. When the operation part 255 is moved upward from its position in which the first and second filter frames 1 and 2 are not inserted in the optical path as shown in FIG. 11(A), the state of FIG. 11(A) changes into a state of having the first filter frame 1 inserted in the optical path as shown in FIG. 11(B). When the operation part 255 is moved further upward, the state of FIG. 11(B) changes into a state of having the first filter frame 1 pulled out and the second filter frame 2 inserted in the optical path as shown in FIG. 11(C).

These changes are brought about by the rotation of the cams 73 and 74 which are caused to rotate together with the gear 77 by the rotation of the lever 254 around the center of rotation 253 transmitted through a gear part 252, which is formed integrally with the lever 254. The interlocked relation of the cams 73 and 74 to the filter frames 1 and 2 is the same as in the case of the fifth embodiment shown in FIG. 8.

Further, the inserted and retracted states of the filters can be detected, for example, as follows. Photo-interrupters 256, 257 and 258 are arranged in combination respectively with light-blocking parts 259, 260 and 262 which are provided on the first and second filter frames 1 and 2. Of the light-blocking parts 259, 260 and 262, the light-blocking part 262 is arranged to rise rectangularly with respect to the paper surface of the drawing. Each light-blocking part is arranged to cover a space between the light-projecting and light-receiving parts of each photo-interrupter. The photo-interrupter 256 is arranged to turn off only when the first filter frame 1 is inserted in the optical path without fail.

According to the arrangement of the driving device and the filter change-over device disclosed as the embodiments of the invention, a first filter member and a second filter member can be selectively moved into and out of a predetermined common position (within an optical path) by operating an operation member. The arrangement permits serial change-over of (1) a state of having both the filters of two different kinds outside of an optical path, (2) another state of having the first filter alone inserted in the optical path and (3) a further state of having the first filter pulled out of the optical path and the second filter inserted in the optical path or having the second filter inserted in the optical path while the first filter is left inside of the optical path.

Assuming that the filters are ND filters, with the first filter assumed to be relatively thin (to permit a large amount of transmission light) and the second filter to be relatively thick (to permit a little amount of transmission light), the ND filters are removed from the optical path in the state (1), only the thin filter is inserted in the optical path in the state (2), and only the thick filter is inserted in the optical path in the state (3).

Compared with the conventional arrangement of inserting and retracting a plurality of filters by using a turret-type mechanism, the arrangement of the invention disclosed above permits reduction in size of the projection area of a lens barrel as viewed in the direction of the optical axis. Besides, in the case of ND filters, the arrangement of the invention permits the quantity of transmission light to be decreased or increased stepwise according to the direction in which the operation member is operated.

Further, even in a case where a film-like filter material is caused to warp or deformed by variations of ambient temperature or humidity, the arrangement for having the filters spaced 0.5 mm to 1.5 mm in the direction of the optical axis according to the invention, effectively prevents the filter surface from being damaged by collision of the filters with each other or with the filter frame.

Further, since the change-over of use of the filters which are arranged to differ from each other in inserting and retracting positions in the direction of the optical axis is arranged to be carried out, for example, by driving cams with a drive source through a gear train, a greater latitude can be allowed in deciding the allocating position of a change-over operation switch.

The disclosed arrangement for making filter change-over following the rotation of an operation dial according to the invention also gives the above-stated advantageous effects.

Further, according to the arrangement of the invention disclosed, the first and second filters can be arranged at desired positions within lens barrels of varied kinds.

What is claimed is:

1. A filter driving device comprising:
   a first optical filter member;
   a second optical filter member; and
   rotary driving means, said rotary driving means being operable to be rotated in a predetermined rotating direction so as to drive said first and second optical filter members to selectively bring about one of a state in which said first optical filter member is located on an optical path, a stare in which said second optical filter member is located on the optical path and a state in which neither of said first and second optical filter members is located on the optical path.
   wherein the distance between said first optical filter member and said second optical filter member changes in the vertical direction of said optical path when selectively driving said first optical filter member and said second optical filter member in order to make said rotary driving means be at least one of said plurality of states.

2. A filter driving device according to claim 1, wherein said rotary driving means is an operation lever operable to be rotated around a predetermined axis.

3. A filter driving device according to claim 1, wherein said rotary driving means is arranged to be rotated by a motor.

4. A filter driving device according to claim 1, wherein said first optical filter member and said second optical filter member are arranged to rotate around a common axis of rotation.

5. A filter driving device according to claim 1, wherein each of said first and second optical filter members is a neutral density filter.

6. A filter driving device according to claim 4, further comprising an urging member arranged to exert urging forces on said first and second optical filter members to urge said first and second optical filter members respectively to rotate in opposite directions around said common axis of rotation, said rotary driving means being a lever member, said lever member being arranged to rotate around an axis of rotation different from said common axis of rotation so as to drive said first and second optical filter members.

7. A filter driving device according to claim 6, wherein said lever member is provided with abutting parts arranged to abut on said first and second optical filter members.

8. A filter driving device according to claim 4, wherein said rotary driving means includes a rotary member ranged to rotate around an axis of rotation different from said common axis of rotation, a first cam member arranged to drive said first optical filter member by rotating integrally with said rotary member around the axis of rotation of said rotary member, and a second cam member arranged to drive said second optical filter member by rotating integrally with said rotary member around the axis of rotation of said rotary member.

9. A filter driving device according to claim 4, wherein said rotary member is provided with a gear which is formed along a periphery thereof and is coupled with an output gear of a motor.

10. A filter driving device according to claim 1, wherein said rotary driving means is arranged to drive said first and second optical filter members so as to bring about a further state in which both said first and second optical filter members are located on the optical path.

11. A filter driving device comprising:
    a first optical filter member;
    a second optical filter member; and
    rotary driving means, said rotary driving means being operable to be rotated in a predetermined rotating direction so as to drive said first and second optical filter members to selectively bring about one of a state in which said first optical filter member is located on an optical path, a state in which both said first and second optical filter members are located on the optical path and a state in which neither of said first and second optical filter members is located on the optical path.

12. A filter driving device according to claim 11, wherein said rotary driving means is an operation lever operable to be rotated around a predetermined axis.

13. A filter driving device according to claim 11, wherein said rotary driving means is arranged to be rotated by a motor.

14. A filter driving device according to claim 11, wherein said first optical filter member and said second optical filter member are arranged to rotate around a common axis of rotation.

15. A filter driving device according to claim 11, wherein each of said first and second optical filter members is a neutral density filter.

16. A lens apparatus comprising;
    a lens system having an optical path;
    a first optical filter member provided movably to a position on said optical path and to a position outside said optical path;
    a second optical filter member provided movably to a position on said optical path and to a position outside said optical path; and
    rotary driving means for driving said first optical filter member and said second optical filter member, said rotary driving, means being rotated in a predetermined rotating direction so as to drive said first and second optical filter members to selectively bring about one of a state in which said first optical filter member is located on said optical path, a state in which said second filter member is located on said optical path and a state in which neither of said first and second optical filter members is located on said optical path.
    wherein the distance between said first optical filter member and said second optical filter member changes in the vertical direction of said optical path when selectively driving said first optical filter member and said second optical filter member in order to make said rotary driving means be at least one of said plurality of states.

17. An apparatus according to claim 16, wherein said rotary driving means is an operation lever operable to be rotated around a predetermined axis.

18. An apparats according to claim 16, wherein said rotary driving means is arranged to be rotated by a motor.

19. An apparatus according in claim 16, wherein said first optical filter member and said second optical filter member are arranged to rotate around a common axis of rotation.

20. An apparatus according to claim 16, wherein each of said first and second optical filter members is a neutral density filter.

21. An apparatus according to claim 19, further comprising an urging member arranged to exert urging forces on said first and second optical filter members to urge said first and second optical filter members, respectively, to rotate in opposite directions around said common axis of rotation, said rotary driving means being a lever member, said lever member being arranged to rotate around an axis of rotation different from said common axis of rotation so as to drive said fist and second optical filter members.

22. An apparatus according to claim 21, wherein said lever member is provided with abutting parts arranged to abut on said first and second optical filter members.

23. An apparatus according to claim 19, wherein said rotary driving means includes a rotary member arranged to rotate around an axis of rotation different from said common axis of rotation, a first cam member arranged to drive said first optical filter member by rotating integrally with said rotary member around the axis of rotation of said rotary member, and a second cam member arranged to drive said second optical filter member by rotating integrally with said rotary member on the axis of rotation of said rotary member.

24. An apparatus according to claim 23, wherein said rotary member is provided with a gear which is formed along a periphery thereof and is coupled with an output gear of a motor.

25. An apparatus according to claim 16, wherein said rotary driving means is arranged to drive said first and second optical filter members so as to bring about a further state in which both of said first and second optical filter members are located on the optical path.

26. A lens apparatus comprising:
a lens system having an optical path;
a first optical filter member provided movably to a position on said optical path and to a position outside said optical path;
a second optical filter member provided movably to a position on said optical path and to a position outside said optical path; and
rotary driving means for driving said first optical filter member and said second optical filter member, said rotary driving means being rotated in a predetermined rotating direction so as to drive said first and second optical filter members to selectively bring about one of a state in which said first optical filter member is located on said optical path, a state in which both of said first and second optical filter members are located on said optical path and a state in which neither of said first and second optical filter members is located on said optical path.

27. An apparatus according to claim 26, wherein said rotary driving means is an operation lever operable to be rotated around a predetermined axis.

28. An apparatus according to claim 26, wherein said rotary driving means is arranged to be rotated by a motor.

29. An apparatus according to claim 26, wherein said first optical filter member and said second optical filter member are arranged to rotate around a common axis of rotation.

30. An apparatus according to claim 26, wherein each of said first and second optical filter members is a neutral density filter.

31. A lens apparatus comprising:
a lens system having an optical path;
a first optical filter member provided movably to a position on said optical path and to a position outside said optical path;
a second optical filter member provided movably to a position on said optical path and to a position outside said optical path; and rotary driving means for driving said first optical filter member and said second optical filter member, said rotary driving means being rotated in a predetermined rotating direction so as to drive said first and second optical filter members to selectively bring about one of a state in which said first optical filter member is located on said optical path, a state in which said second optical filter member is located on said optical path and a slate in which neither of said first and second optical filter members is located on said optical path and a state in which both of said first and second optical filter members are located on said optical path.

32. An optical apparatus comprising:
a lens system having an optical path;
an image pickup unit for receiving light from said lens system;
a first optical filter member provided movably to a position on said optical path and to a position outside said optical path;
a second optical filter member provided movably to a position on said optical path and to a position outside said optical path; and
rotary driving means for driving said first optical filter member and said second optical filter member, said rotary driving means being rotated in a predetermined rotating direction so as to drive said first and second optical filter members to selectively bring about one of a state in which said first optical filter member is located on said optical path, a state in which said second optical filter member is located on said optical path and a state in which neither of said first and second optical filter members is located on said optical path.
wherein the distance between said first optical filter member and said second optical filter member changes in the vertical direction of said optical path when selectively driving said first optical filter member and said second optical filter member in order to make said rotary driving means be at least one of said plurality of states.

33. An optical apparatus comprising:
a lens system having an optical path;
an image pickup unit for receiving light from said lens system;
a first optical filter member provided movably to a position on said optical path and to a position outside said optical path;
a second optical filter member provided movably to a position on said optical path and to a position outside said optical path; and
rotary driving means for driving said first optical filter member and said second optical filter member, said rotary driving means being rotated in a predetermined rotating diction so as to drive said first and second optical filter members to selectively bring about one of a state in which said first optical filter member is located on said optical path, a state in which both of said first and second optical filter members are located on said optical path and a state in which neither of said first and second optical filter members is located on said optical path.

34. An optical apparatus comprising:
a lens system having an optical path;
an image pickup unit for receiving light from said lens system;

a first optical filter member provided movably to a position on said optical path and to a position outside said optical path:

a second optical filter member provided movably to a position on said optical path and to a position outside said optical path; and rotary driving means for driving said first optical filter member and said second optical filter member, said rotary driving means being rotated in a predetermined rotating direction so as to drive said first and second optical filter members to selectively bring about one of a state in which said first optical filter member is located on said optical path, a state in which said second optical filter member is located on said optical path, a state in which neither of said first and second optical filter members is located on said optical path and a state in which both of said first and second optical filter members are located on said optical path.

35. A filter driving device comprising.

a plurality of optical filter members provided movably to a position on an optical path and to a position outside the optical path; and rotary driving means for driving said plurality of optical filter members, said rotary driving means being rotated in a predetermined rotating direction so as to drive said plurality of optical filter members to selectively bring about one of a state in which one optical filter member in said plurality of optical filter members is located on said optical path, a state in which another optical filter member in said plurality of optical filter members is located on said optical path and a state in which none of said plurality of optical filter members is located on said optical path, wherein the distance in the vertical direction of said optical path of at least two of said plurality of optical filter members changes when selectively driving said plurality of optical filter members in order to make said rotary driving means be at least one of said plurality of states.

36. An apparatus according to claim 35. wherein said rotary driving means drives said plurality of optical filter members to selectively bring about a state in which at least two optical filter members in said plurality of optical filter members are located on said optical path.

37. A lens apparatus comprising:

a lens system having an optical path;

a plurality of optical filter members provided movably to a position on said optical path and to a position outside said optical path; and rotary driving means for driving said plurality of optical filter members, said rotary driving means being rotated in a predetermined rotating direction so as to drive said plurality of optical filter members to selectively bring about one of a state in which one optical filter member in said plurality of optical filter members is located on said optical path, a state in which another optical filter member in said plurality of optical filter members is located on said optical path, a state in which at least two optical filter members in said plurality of optical filter members are located on said optical path and a state in which none of said plurality of optical filter members is located on said optical path.

38. An optical apparatus comprising;

a lens system having an optical path;

an image pickup unit for receiving light from said lens system;

a plurality of optical filter members provided movably to a position on said optical path and to a position outside said optical path; and rotary driving means for driving said plurality of optical filter members, said rotary driving means being rotated in a predetermined rotating direction so as to drive said plurality of optical filter members to selectively bring about one of a state in which one optical filter member in said plurality of optical filter members is located on said optical path, a state in which another optical filter member in said plurality of optical filter members is located on said optical path, a state in which at least two optical filter members in said plurality of optical filter members are located on said optical path and a state in which none of said plurality of optical filter members is located in said optical path.

\* \* \* \* \*

UNITED STATES PATENT AND TRADEMARK OFFICE
CERTIFICATE OF CORRECTION

PATENT NO.   : 6,452,732 B1
DATED        : September 17, 2002
INVENTOR(S)  : Tadanori Okada et al.

It is certified that error appears in the above-identified patent and that said Letters Patent is hereby corrected as shown below:

Column 12,
Line 49, delete ""1125"" and insert -- "125" --.

Column 15,
Line 20, delete "stare" and insert -- state --.

Signed and Sealed this

Twenty-first Day of October, 2003

JAMES E. ROGAN
*Director of the United States Patent and Trademark Office*